US012242129B2

(12) United States Patent
Hwang et al.

(10) Patent No.: US 12,242,129 B2
(45) Date of Patent: Mar. 4, 2025

(54) DEVICE AND METHOD TO CALIBRATE PARALLAX OPTICAL ELEMENT FOR TEMPERATURE CHANGE

(71) Applicant: SAMSUNG ELECTRONICS CO., LTD., Suwon-si (KR)

(72) Inventors: Chansol Hwang, Suwon-si (KR); Byong Min Kang, Yongin-si (KR); Chansu Kim, Seoul (KR); Yoonsun Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 18/095,338

(22) Filed: Jan. 10, 2023

(65) Prior Publication Data

US 2023/0221518 A1    Jul. 13, 2023

(30) Foreign Application Priority Data

Jan. 12, 2022 (KR) .......................... 10-2022-000443
Mar. 21, 2022 (KR) ........................ 10-2022-0034671

(51) Int. Cl.
*G02B 7/28* (2021.01)
*G02B 7/02* (2021.01)
(Continued)

(52) U.S. Cl.
CPC ............. *G02B 7/028* (2013.01); *G02B 27/01* (2013.01); *G02B 30/27* (2020.01); *G02B 2207/101* (2013.01)

(58) Field of Classification Search
CPC .... G02B 30/27; G02B 7/028; G02B 27/0101; G02B 27/01; G02B 2207/101; G02B 2027/0123; G02B 2027/0134
See application file for complete search history.

(56) References Cited

U.S. PATENT DOCUMENTS

| 8,049,772 B2 | 11/2011 | Lipton et al. |
| 2007/0097502 A1* | 5/2007 | Lipton .................. G02B 7/028 359/463 |
| 2012/0257018 A1* | 10/2012 | Shigemura ............ G02B 30/27 348/46 |

FOREIGN PATENT DOCUMENTS

| EP | 2 693 758 A2 | 2/2014 |
| JP | 5761522 B2 | 8/2015 |

(Continued)

OTHER PUBLICATIONS

Communication issued Jun. 9, 2023 by the European Patent Office in European Patent Application No. 22216454.3.

*Primary Examiner* — Tsion B Owens

(74) *Attorney, Agent, or Firm* — Sughrue Mion, PLLC

(57) ABSTRACT

Provided is an electronic device including a display, a parallax optical element configured to provide light corresponding to an image output from the display to an eyebox of a user, a temperature sensor configured to measure a temperature around the parallax optical element, a memory configured to store a plurality of parameter calibration models for determining correction information in different temperature ranges for a parameter of the parallax optical element, and a processor configured to determine correction information corresponding to the measured temperature based on a parameter calibration model corresponding to the measured temperature among the plurality of parameter calibration models, and adjust the parameter of the parallax optical element based on the correction information.

18 Claims, 12 Drawing Sheets

(51) Int. Cl.
 *G02B 27/01* (2006.01)
 *G02B 30/27* (2020.01)

(56) References Cited

FOREIGN PATENT DOCUMENTS

| | | | |
|---|---|---|---|
| JP | 2020-197583 | A | 12/2020 |
| KR | 10-1012691 | B1 | 2/2011 |
| KR | 10-2021-0009203 | A | 1/2021 |

* cited by examiner

DEVICE AND METHOD TO CALIBRATE PARALLAX OPTICAL ELEMENT FOR TEMPERATURE CHANGE

CROSS-REFERENCE TO RELATED APPLICATIONS

This application claims priority from Korean Patent Application No. 10-2022-0004443, filed on Jan. 12, 2022, and Korean Patent Application No. 10-2022-0034671, filed on Mar. 21, 2022, in the Korean Intellectual Property Office, the disclosures of which are incorporated herein by reference in their entireties.

BACKGROUND

1. Field

Example embodiments of the present disclosure relate to a device and method to calibrate a parallax optical element for a temperature change.

2. Description of Related Art

The most dominant factor among factors for recognizing a stereoscopic image is a difference between images viewed by both eyes of a user. A scheme of presenting different images to both eyes of a user may include a stereoscopic scheme of filtering images using, for example, polarization-based division, time division, or wavelength division of varying a wavelength of a primary color, and an autostereoscopic scheme of presenting each image to be viewed from a predetermined viewpoint using a three-dimensional (3D) conversion device, such as, for example, a parallax barrier, a lenticular lens, or a directional backlight unit.

Using the autostereoscopic scheme, the inconvenience of wearing glasses may be reduced. In the autostereoscopic scheme, a 3D image may be accurately projected toward both eyes of a user to prevent crosstalk of the 3D image. However, an image quality may be degraded when an error different from a design value occurs in a production process or an installation process of a 3D display device and a 3D conversion device.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an electronic device including a display, a parallax optical element configured to provide light corresponding to an image output from the display to an eyebox of a user, a temperature sensor configured to measure a temperature around the parallax optical element, a memory configured to store a plurality of parameter calibration models for determining correction information in different temperature ranges for a parameter of the parallax optical element, and a processor configured to determine correction information corresponding to the measured temperature based on a parameter calibration model corresponding to the measured temperature among the plurality of parameter calibration models, and adjust the parameter of the parallax optical element based on the correction information.

Temperature ranges corresponding to the plurality of parameter calibration models, respectively, may not overlap each other.

The processor may be further configured to determine the correction information based on a first parameter calibration model corresponding to a first temperature range based on the measured temperature included in the first temperature range being greater than a reference temperature; and determine the correction information based on a second parameter calibration model corresponding to a second temperature range based on the measured temperature included in the second temperature range being less than or equal to the reference temperature.

The reference temperature may be determined based on a temperature section in which the parameter of the parallax optical element changes non-linearly, wherein the processor may be further configured to, based on the measured temperature being greater than the reference temperature, determine the correction information based on the first parameter calibration model, and based on the measured temperature being less than or equal to the reference temperature, determine the correction information based on the second parameter calibration model.

A value of the reference temperature may be greater than or equal to 20° C. and less than or equal to 30° C.

The memory may be further configured to store a first parameter calibration model corresponding to a first temperature that is greater than a default temperature upper limit, a second parameter calibration model corresponding to a second temperature that is less than or equal to a default temperature lower limit, and a third parameter calibration model corresponding to a default temperature range between the default temperature upper limit and the default temperature lower limit, and the processor may be further configured to select one of the first parameter calibration model, the second parameter calibration model, and the third parameter calibration model based on the measured temperature, and determine the correction information corresponding to the measured temperature based on the selected model.

The plurality of parameter calibration models may be each built based on reference parameter values obtained by performing calibration at two or more temperature values included in a temperature range corresponding to a model among the plurality of parameter calibration models.

The plurality of parameter calibration models my each include at least one of a function representing a relationship between correction information and a temperature obtained based on a regression analysis corresponding to the reference parameter values, and mapping information corresponding to correction information mapped for each predetermined temperature.

At least one of the plurality of parameter calibration models may be built based on reference parameter values obtained at first temperature intervals in a non-linear temperature section of a temperature range corresponding to the at least one of the plurality of parameter calibration models and reference correction values obtained at second temperature intervals, being wider than the first temperature intervals, in a temperature section other than the non-linear temperature section.

The processor may be further configured to obtain a correction value corresponding to a pitch as the correction information, and perform parameter correction by applying the correction value to a pitch parameter value of the parallax optical element.

According to another aspect of an example embodiment, there is provided a parameter correction method performed by a processor, the parameter correction method including providing, via a parallax optical element, light corresponding to an image output from a display to an eyebox of a user, determining correction information corresponding to a temperature measured for the parallax optical element based on a parameter calibration model corresponding to the measured temperature among a plurality of parameter calibration models for determining correction information in different temperature ranges, and adjusting a parameter of the parallax optical element based on the correction information.

Temperature ranges corresponding to the plurality of parameter calibration models, respectively, may not overlap each other.

The determining of the correction information may include determining the correction information based on a first parameter calibration model corresponding to a first temperature range based on the measured temperature included in the first temperature range exceeding a reference temperature, and determining the correction information based on a second parameter calibration model corresponding to a second temperature range based on the measured temperature included in the second temperature range being less than or equal to the reference temperature.

The reference temperature may be determined based on a temperature section in which the parameter of the parallax optical element changes non-linearly, wherein the determining of the correction information may include, based on the measured temperature being greater than the reference temperature, determining the correction information based on the first parameter calibration model, and based on the measured temperature being less than or equal to the reference temperature, determining the correction information based on the second parameter calibration model.

A temperature value of the reference temperature may be greater than or equal to 20° C. and less than or equal to 30° C.

The parameter correction method may further include storing a first parameter calibration model corresponding to a first temperature that is greater than a default temperature upper limit, a second parameter calibration model corresponding to a second temperature that is less than or equal to a default temperature lower limit, and a third parameter calibration model corresponding to a default temperature range between the default temperature upper limit and the default temperature lower limit, wherein the determining of the correction information may include selecting one of the first parameter calibration model, the second parameter calibration model, and the third parameter calibration model based on the measured temperature, and determining the correction information corresponding to the measured temperature based on the selected model.

The plurality of parameter calibration models may be each built based on reference parameter values obtained by performing calibration at two or more temperature values included in a temperature range corresponding to a model among the plurality of parameter calibration models.

The plurality of parameter calibration models may each include at least one of a function representing a relationship between correction information and a temperature obtained based on a regression analysis corresponding to the reference parameter values, and mapping information corresponding to correction information mapped for each predetermined temperature.

At least one of the plurality of parameter calibration models may be built based on reference parameter values obtained at first temperature intervals in a non-linear temperature section of a temperature range corresponding to the at least one of the plurality of parameter calibration models and reference correction values obtained at second temperature intervals, being wider than the first temperature intervals, in a temperature section other than the non-linear temperature section.

According to yet another aspect of an example embodiment, there is provided a non-transitory computer-readable storage medium storing instructions that, when executed by a processor, cause the processor to perform a parameter correction method, the method including providing, via a parallax optical element, light corresponding to an image output from a display to an eyebox of a user, determining correction information corresponding to a temperature measured for the parallax optical element based on a parameter calibration model corresponding to the measured temperature among a plurality of parameter calibration models for determining correction information in different temperature ranges, and adjusting a parameter of the parallax optical element based on the correction information.

BRIEF DESCRIPTION OF THE DRAWINGS

The above and/or other aspects will be more apparent by describing example embodiments with reference to the accompanying drawings, in which.

DETAILED DESCRIPTION

Figure 1:
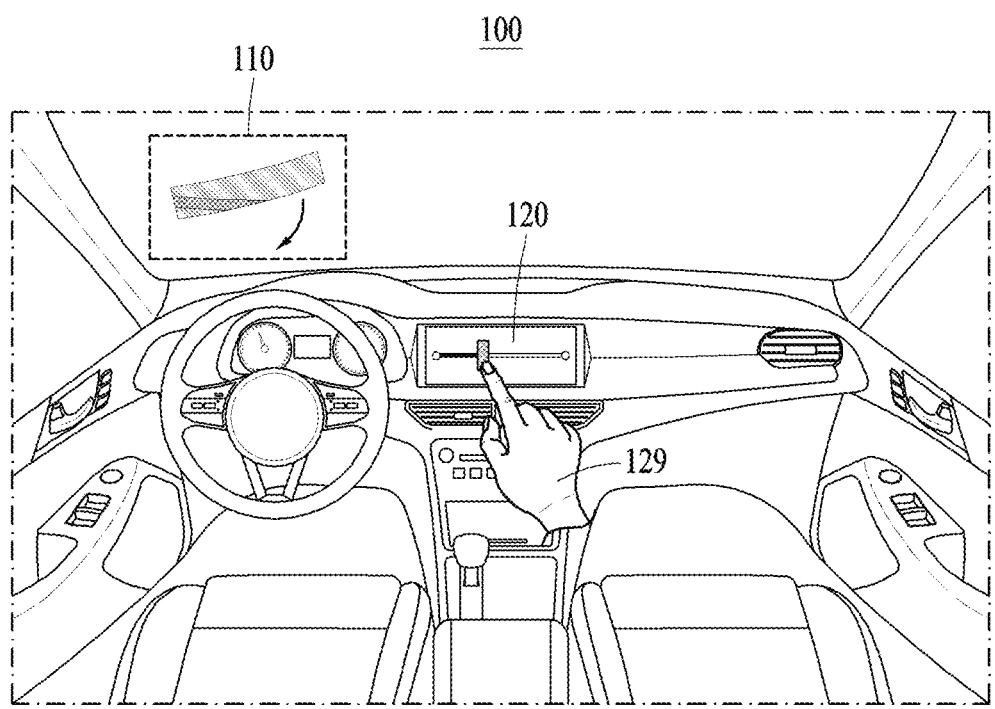
FIG. 1 illustrates an electronic device that performs calibration of a parallax optical element according to an example embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like constituent elements and a repeated description related thereto will be omitted.

FIG. 1 illustrates an electronic device that performs calibration of a parallax optical element according to an example embodiment.

An electronic device 100 may provide a stereoscopic image to a user. For example, the electronic device 100 may provide images having binocular disparity to both eyes of a user. Images having binocular disparity may include, for example, a first image provided to a left eye of a user and a second image provided to a right eye of the user. Pixels corresponding to the same object and/or the same point in the first image and the second image may be spaced apart as much as the disparity required according to a depth of the object and/or the point (e.g., a distance to the object defined and/or set for the user to recognize). However, for ease of description, an example of providing a stereoscopic image to both eyes of the user, in detail, providing images to a first viewpoint corresponding to the left eye of the user and a second viewpoint corresponding to the right eye, is described. However, embodiments are not limited thereto. According to the design, images may be provided to two or more viewpoints, or a stereoscopic image may be provided to two or more users. For example, the electronic device 100 may provide an image pair having binocular disparity for each pixel to a first viewpoint corresponding to a left eye of a first user and a second viewpoint corresponding to a right eye of the first user. Also, the electronic device 100 may provide an image pair having binocular disparity for each pixel to a third viewpoint corresponding to a left eye of a second user and a fourth viewpoint corresponding to a right eye of the second user.

For reference, herein, an eyebox corresponding to one viewpoint may be an area in which an image pair corresponding to the viewpoint is to be provided. For example, an eyebox may be determined to correspond to a gaze height of a user, and when the user gazes toward the front within the eyebox, the image pair described above may be viewable to the user.

The electronic device 100 may output an image through a display panel, and a parallax optical element of the electronic device 100 may direct light corresponding to the output image to a plurality of viewpoints. Due to errors and/or tolerances in the manufacturing process, a portion of an image to be provided to the contralateral eye may be observed by the left eye and/or the right eye of the user without fine tuning through calibration. As described above, when an image to be observed at another viewpoint is provided, it may be referred to as crosstalk. When only a left image is observed at a viewpoint corresponding to a left eye of a user, and only a right image is observed at a viewpoint corresponding to a right eye of the user, the user may recognize a more accurate sense of depth and view a clearer image.

The electronic device 100 may perform calibration to reduce and/or eliminate the above-described crosstalk. The electronic device 100 may provide a user with a calibration pattern 110 corresponding to a pattern image for calibration. As described later, an image ray generated from each point of the pattern image displayed on a display may reach the eyebox by the parallax optical element of the electronic device 100. For example, in the eyebox, a combined form of image rays reaching the eyebox from the display through the parallax optical element may be visually observed. The calibration pattern 110 may be a visual pattern that is formed as the image rays corresponding to the pattern image reach the eyebox through the parallax optical element and are combined therein.

The electronic device 100 may receive an input 129 for calibration from a user who observes the calibration pattern 110 corresponding to the pattern image. When the input 129 for calibration is received, the electronic device 100 may adjust a parameter of the parallax optical element by the corresponding input 129. The electronic device 100 may change the calibration pattern 110 corresponding to the pattern image according to the adjusted parameter. The user may repeatedly input the above-described manipulation for calibration until a calibration pattern corresponding to the calibration pattern 110 that corresponds to the pattern image is aligned with a reference line (e.g., a vertical line and/or a horizontal line). The electronic device 100 may provide an input interface 120 for manipulation for calibration. For example, in FIG. 1, when a touch screen of the electronic device 100 displays a slider bar, and when the electronic device 100 detects the input 129 on the slider bar (e.g., an input for horizontally moving a slider bar object), the parameter of the parallax optical element may be adjusted. However, the adjustment of the parameter of the parallax optical element for changing the calibration pattern 110 is not limited to relying on a manual input from the user. For example, the electronic device 100 may observe the calibration pattern 110 from the eyebox through a separate camera facing the same direction as a direction the user is facing, and adjust the aforementioned parameter of the parallax optical element based on the observation results.

For reference, as shown in FIG. 1, the electronic device 100 mounted on a vehicle may provide a content image and/or a pattern image to a user by projecting the content image and/or the pattern image through a windshield of the vehicle. A head-up display (HUD) using a windshield will be described below with reference to FIG. 2.

Figure 2:
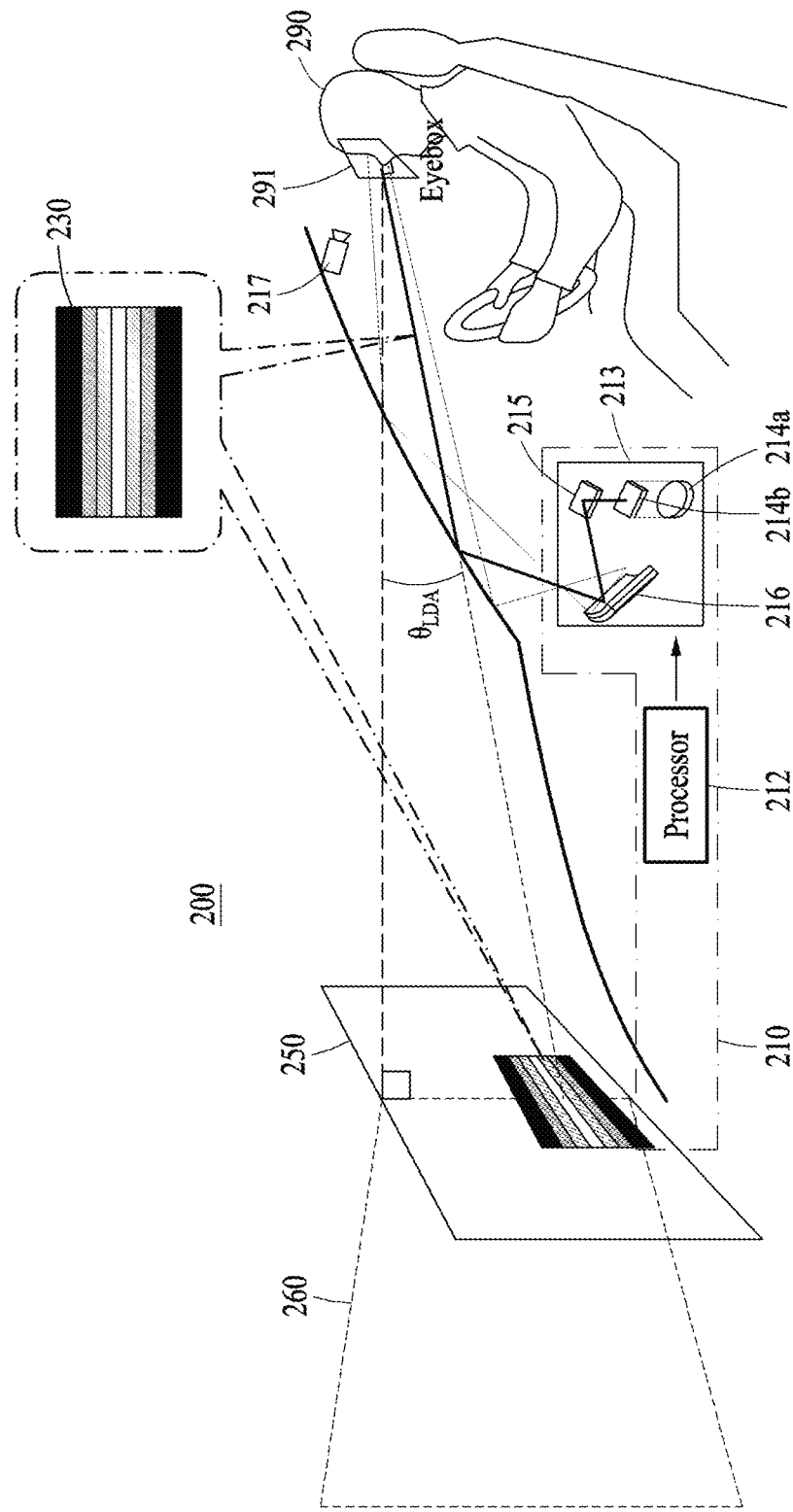
FIG. 2 illustrates an example in which an electronic device includes a head-up display (HUD) according to an example embodiment.

FIG. 2 illustrates an example in which an electronic device includes an HUD according to an example embodiment.

A calibration system 200 may be a system that provides a user 290 with calibration of a parallax optical element, and may be, for example, a device including an electronic device 210 (e.g., the electronic device 100 of FIG. 1).

The electronic device 210 may include a processor 212 and an HUD 213. The electronic device 210 may further include an eye detector 217.

The processor 212 may provide a pattern image to the user 290 by outputting a rendered pattern image through the HUD 213. The processor 212 may re-render and provide a pattern image according to the parameter adjusted based on an input from the user during calibration and/or the observation result from the separate camera disposed in the eyebox 291. The processor 212 may output a content image generated by rendering content using a parameter fixed after the calibration is completed (e.g., a parameter obtained in response to the completion of the calibration). When the parallax optical element directs image rays corresponding to the content image as described below, the directed image rays may be combined in the eyebox. The combination of the image rays corresponding to the content image may be visualized as content in the eyebox and observed by a user positioned in the eyebox.

The content may include, for example, information associated with driving. In the case of a vehicle, the information associated with driving (hereinafter, driving information) may include, for example, route guidance information and driving related information.

The HUD 213 may visualize a stereoscopic image in a visible region of the user 290 that is positioned in front of the user 290. For example, the HUD 213 may visualize a pattern image on a window (e.g., a windshield of a vehicle) disposed in front of the user 290. The HUD 213 may form a virtual projection plane. Hereinafter, the virtual projection plane may be referred to as a virtual image plane 250. The virtual image plane 250 may be a plane on which a virtual image including a pattern generated by the HUD 213 is displayed. The user 290 may recognize the virtual image as being disposed on the virtual image plane 250. For reference, due to an optical system of the HUD 213 and a windshield of a vehicle, a user may view an image 230 that represents a calibration pattern (e.g., an observed pattern) of a different type from an intended calibration pattern. For example, the user 290 may view the image 230 observed in the eyebox 291. For example, the observed image 230 may represent a form in which the calibration pattern is blurred more than intended or a gradation is added to the calibration pattern.

Also, the HUD 213 may visualize a content image having a depth on the virtual image plane 250. For example, the processor 212 may provide the user 290 with a content image including a left image and a right image with binocular disparity corresponding to a depth at which an object may be visualized, using the HUD 213. The HUD 213 may visualize content having a corresponding depth in a virtual region 260 on the virtual image plane 250. In an example, the processor 212 may render content to be a 3D graphic representation based on an optical system of the HUD 213. The 3D graphic representation may express a stereoscopic graphic representation having a depth. The HUD 213 may form a content image including a left image and a right image on the virtual image plane 250 based on a depth of the content. Through the virtual image plane 250, the left image may be provided to the left eye of the user 290 and the right image may be provided to the right eye of the user 290. For example, one virtual image may be formed on the virtual image plane 250, but may be separated into light corresponding to the left image and light corresponding to the right image by the optical system according to the HUD 213 and the windshield, so that the left image and the right image may be directed to the left eye and the right eye of the user 290, respectively. As described above, the eyebox 291 may include, as regions that the light corresponding to the left image and the light corresponding to the right image reach, regions corresponding to the left eye and the right eye of the user 290. Accordingly, the light corresponding to the left image and the right image representing the content may separately reach both eyes of the user in the eyebox 291, so that the user 290 may recognize the sense of depth of three-dimensionally rendered content.

The HUD 213 may include, for example, a picture generator, a fold mirror 215, and a magnifying mirror 216 (e.g., a concave mirror). The picture generator may include a display and a parallax optical element. The parallax optical element may include, for example, a lenticular lens and a parallax barrier. The display device may include a light source 214a and a display (e.g., a display panel 214b). Among image rays passing through the display panel 214b as light is emitted from the light source 214a, an image ray passing through a portion of the display panel 214b corresponding to the left image may be directed to the left eye of the user by the parallax optical element, and an image ray passing through a portion corresponding to the right image may be directed to the right eye of the user. The observed image 230 shown in FIG. 2 may be an image observed from an eyebox corresponding to one eye, and may include a calibration pattern formed as image rays corresponding to a pattern image are combined. However, the configuration of the HUD 213 is not limited thereto, and according to the design, the HUD 213 may include various components to form the virtual image plane 250 on which a virtual image is formed through projection to a window disposed in front of the user 290.

Although an example in which the electronic device 210 is mounted on a vehicle is described herein, embodiments are not limited thereto. For example, the electronic device 210 may be applied to technology that combines information of a real world and information of a virtual world, such as, for example, augmented reality (AR) glasses or mixed reality (MR), and may be applied to a vehicle, such as, for example, a motorcycle, an airplane, or a train in addition to an automobile.

In an example, the electronic device 210 may continue to express a depth by adjusting the depth of the content, without changing a position of the virtual image plane 250 formed by the HUD 213. Since a change of the position of the virtual image plane 250 is not needed, the electronic device 210 may not require a physical control of the components included in the HUD 213.

A look down angle (LDA) OLDA may be an angle at which a gaze of a user looks down, and may be an angle between the virtual image plane 250 formed by the display device and the parallax optical element and the eyebox 291. For example, the LDA OLDA may indicate an angle between a plane on which the eyebox 291 is disposed and the virtual image plane 250.

The electronic device 210 may adjust a parameter of the parallax optical element according to a temperature change of the HUD 213. For example, the electronic device 210 may adjust the parameter using correction information determined with respect to a measured temperature, and output an image (e.g., a pattern image and/or a content image) generated by rendering a calibration pattern and/or content using the adjusted parameter through a display device (e.g., the display panel 214b). As described below, the parallax optical element may direct image rays corresponding to the output image to be provided to the user in a form of being combined in the eyebox. Changes in the parameter of the parallax optical element will be described below with reference to FIGS. 7A and 7B.

Figure 3:
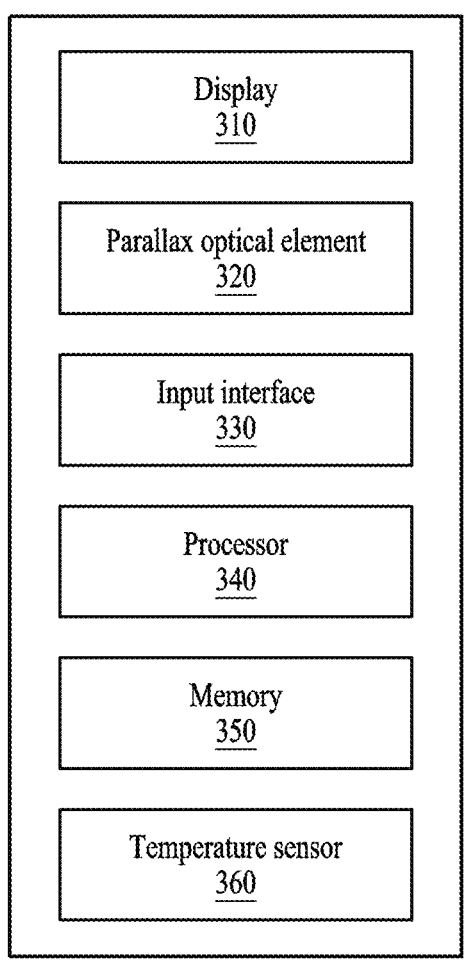
FIG. 3 is a block diagram of an electronic device according to an example embodiment.

FIG. 3 is a block diagram of an electronic device according to an example embodiment.

An electronic device 300 may include a display 310, a parallax optical element 320, an input interface 330, a processor 340, and a memory 350. The electronic device 300 may further include an eye detector (e.g., the eye detector 217 of FIG. 2) and a separate camera device.

The display 310 may visualize and output a pattern image and/or a content image. For example, the display 310 may output an image rendered by the processor 340 of the electronic device 300. The processor 340 may generate a pattern image by rendering a calibration pattern using parameters of the parallax optical element 320. According to another example embodiment, the processor 340 may generate a content image by rendering content. The display 310 may output the rendered pattern image and/or the rendered content image. The pattern image and the content image may each be an image in which images (e.g., a left image and a right image) corresponding to a plurality of viewpoints are mixed. The display 310 may generate light corresponding to the output image through a light source (e.g., a backlight unit) and/or self-luminescence and transmit the light to the parallax optical element 320, which will be described later. For example, the display 310 may be implemented as at least a portion of an HUD mounted on a vehicle, such as, for example, a motorcycle, an automobile, a train, a watercraft, an aircraft, or a spacecraft.

The parallax optical element 320 may provide the light corresponding to the image output from the display 310 to an eyebox of a user. The parallax optical element 320 may be an optical element that is disposed on one surface (e.g., a front surface or a rear surface) of the display 310 to direct the light corresponding to the image output on the display 310 to a plurality of viewpoints. Herein, an eyebox at one of the plurality of viewpoints will be mainly described as an example. For example, the parallax optical element 320 may direct light passing through a portion corresponding to a left image, of the image output on the display 310, to an optical path to a left eye of the user in the eyebox. Similarly, the parallax optical element 320 may direct light passing through a portion corresponding to a right image, of the image output on the display 310, to an optical path to a right eye of the user in the eyebox. The parallax optical element 320 may include optical layers, for example, a lenticular lens array, a parallax barrier, and a directional backlight unit. As image rays directed to the eyebox by the parallax optical element 320 (e.g., image rays corresponding to the pattern image and/or the content image) are combined, an intended image may be observed in the eyebox. The intended image may be an image including the calibration pattern and/or the content described above.

For reference, the picture generator of FIG. 2 may include the display 310 and the parallax optical element 320. However, although the HUD 213 is mainly described as an example to provide a stereoscopic image through a windshield in a vehicle in FIG. 2, embodiments are not limited thereto. The mirrors 215 and 216 of the HUD 213 may magnify the light corresponding to the image generated by the display 310 and the parallax optical element 320, and provide the magnified light to the user, and an optical system for magnifying an image may be changed according to an application. For example, a mirror may be omitted depending on a design of an HUD, and mirrors may not be necessary in a flat panel display, for example, a television (TV). Hereinafter, for ease of description, the description of the optical system (e.g., a fold mirror and a concave mirror) for magnifying the image described above will be omitted below in FIGS. 3 to 13, and an optical path directly to an eye (e.g., a left eye) of a user by the display panel and the parallax optical element 320 disposed on the front surface or the rear surface thereof (e.g., the lenticular lens disposed on the front surface or the directional backlight unit disposed on the rear surface) will be described. For example, a lenticular lens may be laminated on one surface of the display panel. However, embodiments are not limited thereto, and optical elements (e.g., mirrors) for forming a virtual image plane may be additionally included as necessary according to an application.

For reference, although an example of the magnifying mirror being rotated by motor driving is described above in FIG. 2, embodiments are not limited thereto, and at least one of the plurality of optical elements forming the optical path described above may be configured to be rotatable by a motor. The optical path may be changed by a movement and/or rotation of at least one optical element by motor driving, and the position of the eyebox (e.g., the eyebox 291 in FIG. 2) may be changed due to the change in the optical path.

By combining the display 310 and the parallax optical element 320 described above, the electronic device 300 may provide a left image and a right image to the left eye and the right eye of the user, respectively. The electronic device 300 may visualize content having a depth to be a stereoscopic graphic object and provide the content to the user, by spacing a graphic object to which the content is visualized in the left image and a graphic object to which the content is visualized in the right image apart from each other based on binocular disparity. For example, the image rays described above may be combined so that a left image and a right image may be formed in the eyebox, and the content included in the left image and the content included in the right image may have binocular disparity with respect to each other.

The input interface 330 may receive an input from the user. For example, the input interface 330 may receive an input for calibration of the parallax optical element 320 from a user who observes a pattern image in an eyebox. For example, the input interface 330 may include at least one of or a combination of two or more of a touch panel, a touch screen, a dial, a jog dial, a shuttle dial, a click wheel, a button, a slider bar, and a control lever. However, the example of the input interface 330 is not limited to the foregoing description, and the input interface 330 may include various structures supporting rotation control (e.g., a dial) and/or linear control (e.g., a slider bar).

In the present specification, a pattern image may be an image representing a pattern for calibration (hereinafter, referred to as a "calibration pattern"), and may represent an image in which one or more source images including the calibration pattern are rendered using parameters of a parallax optical element. For example, the pattern image may be an image output from the display, and the calibration pattern may be a pattern that is included in an image observed in the eyebox by a combination of image rays corresponding to the pattern image. An example of the calibration pattern and an example of the pattern image will be described below with reference to FIGS. 4 and 5.

The processor 340 may adjust a parameter of the parallax optical element 320 in response to a temperature change of the parallax optical element 320. For example, the processor 340 may determine correction information corresponding to a measured temperature using a parameter calibration model corresponding to the measured temperature among a plurality of parameter calibration models. A parameter calibration model may be a model for linearly modeling a deviation of a parameter of a parallax optical element according to temperature based on data actually measured for each temperature. The correction information, which is a result of calculation using the parameter calibration model, may be used to compensate for the deviation of the parameter. The correction information may be information for correction to a parameter that the parallax optical element should have at an individual temperature, and may include a parameter value (e.g., a pitch value or a position offset value) (e.g., a corrected parameter value itself) that the parallax optical element should have at a corresponding temperature and/or a correction value for calibrating a default parameter set based on a reference temperature (e.g., room temperature of 20° C.) of the parallax optical element. The correction value may be a difference between the parameter value that the parallax optical element should have at an individual temperature and the default parameter value set at the reference temperature.

The processor 340 may adjust the parameter of the parallax optical element using the correction information. For example, when the correction information includes a parameter value, the electronic device may replace the default parameter with the parameter value at the measured temperature. As another example, when the correction information includes a correction value, the electronic device may obtain a corrected parameter value by applying (e.g., adding and/or subtracting) the correction value at the measured temperature to the default parameter. Herein, an example in which the correction information for the measured temperature includes a correction value will be mainly described.

The operation of the processor 340 is not limited to those described above, and a more detailed operation of the processor 340 will be described below with reference to FIGS. 4 to 13. The processor 340 may be an independent processor in the HUD or a processor for operating the HUD. Each parameter of the parallax optical element 320 will be described below with reference to FIG. 6.

The memory 350 may temporarily or permanently store information used for calibration. The memory 350 may store a plurality of parameter calibration models for determining correction information in different temperature ranges for a parameter of the parallax optical element. For example, the memory 350 may store instructions to be executed by the processor 340 to perform operations according to FIGS. 4 to 13 that will be described below. Also, the memory 350 may store calibrated parameters (e.g., a pitch parameter, a slanted angle parameter, and a position offset parameter). The memory 350 may be a cache memory accompanying the processor 340, but is not limited thereto, and may be a storage medium separated from the processor 340.

A temperature sensor 360 may measure a temperature around the parallax optical element. According to an example embodiment, the temperature sensor 360 may be disposed in a space where the parallax optical element is positioned in the electronic device. For example, the temperature sensor 360 may be accommodated in a housing accommodating the parallax optical element 320 (e.g., a housing of the HUD 213 of FIG. 2). For reference, although the degree Celsius is mainly described as a unit of measurement by the temperature sensor 360 in the present specification, embodiments are not limited thereto.

The eye detector may detect a position of an eye (e.g., a left eye and/or a right eye) of a user. The electronic device 300 may provide an image to the eyebox through the display 310 and the parallax optical element 320. The electronic device 300 may provide a pattern image for calibration to the eyebox. The electronic device 300 may detect a gaze height of the user through the eye detector described above, and determine the position of the eyebox based on the gaze height. The eye detector may include a camera that may capture an interior of a vehicle, for example, as shown in FIG. 2. The eye detector may detect the position of an eye from an image that is acquired by capturing the interior of the vehicle and that includes a user (e.g., a driver). However, embodiments are not limited thereto, and the processor 340 of the electronic device 300 may receive an internal image captured by a separate internal camera that is independent of the electronic device 300, and may detect and/or track a position of an eye of a user from the received internal image.

The electronic device 300 may include a separate camera for automatic calibration. The separate camera may be disposed at a position corresponding to an eyebox where both eyes of the user are predicted and/or estimated to be positioned. During the calibration of parameters of the parallax optical element 320, the separate camera may capture an image reaching the eyebox (e.g., an observed image) as a pattern image output from the display 310 passes through the parallax optical element 320. The processor 340 of the electronic device 300 may automatically repeat adjusting the position offset parameter of the parallax optical element until a reference line of the calibration pattern included in the image captured by the camera installed in the eyebox is aligned, thereby performing calibration of the position offset parameter. For example, the processor 340 may repeat updating the position offset parameter until the reference line of the observed image is positioned at the center of the calibration pattern. The reference line and alignment of the calibration pattern will be described below with reference to FIG. 6.

Figure 4:
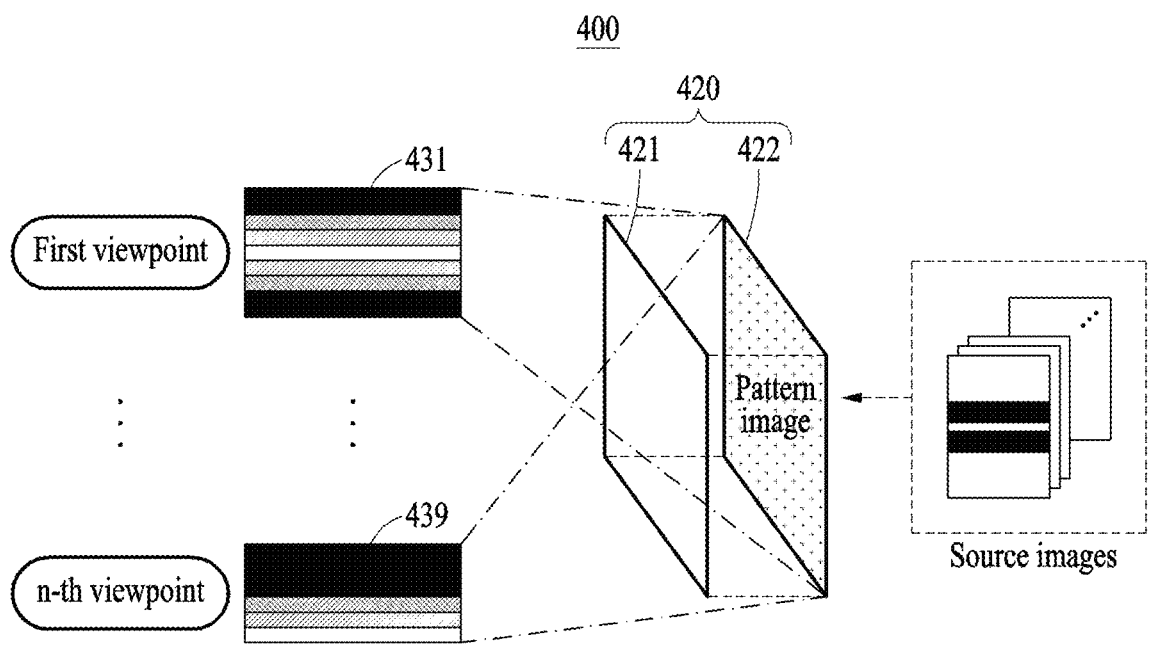
FIG. 4 illustrates source images, a pattern image, and observed images for calibration of a parallax optical element according to an example embodiment.

FIG. 4 illustrates source images, a pattern image, and observed images for calibration of a parallax optical element according to an example embodiment.

A calibration system 400 may include an electronic device 420. The electronic device 420 may include a parallax optical element 421 (e.g., the parallax optical element 320 of FIG. 3) and a display panel 422 (e.g., a display panel of the display 310 of FIG. 3).

The electronic device 420 may generate a pattern image based on source images. The source images may be stored in the electronic device 420 or may be provided to the electronic device 420 by another device external to the electronic device 420. The source images may each correspond to a viewpoint. For example, "n" source images may individually correspond to a first viewpoint to an n-th viewpoint. Here, "n" may be an integer greater than or equal to "2". Although an example of n=2 is mainly described herein, example embodiments are not limited thereto. If an image is provided only to viewpoints respectively corresponding to both eyes of a user, "n" may be "2". The electronic device 420 may generate a pattern image based on parameters so that an image corresponding to a reference viewpoint among a plurality of viewpoints corresponding to the source images may be observed from the reference viewpoint, which will be further described below. The reference viewpoint may be, for example, a viewpoint corresponding to a left eye of a user. The user may proceed with a calibration procedure while observing the pattern image only with a left eye while closing a right eye during calibration. The reference viewpoint may be positioned in the eyebox.

The electronic device 420 may display the pattern image through the display panel 422. The pattern image may be understood as a panel image that is generated based on source images including linear patterns and that represents a calibration pattern. For example, the calibration pattern may be expressed to be divided in the pattern image, and the divided portions of the pattern image may be combined through the parallax optical element at an individual viewpoint, such that the calibration pattern may be observed at an intended position (e.g., the eyebox). Although calibration patterns are illustrated with horizontal lines that have a thickness and are blurred in observed images 431 to 439 in FIG. 4, embodiments are not limited thereto, and the calibration patterns may be vertical lines that have a thickness and are blurred. A calibration pattern with a horizontal line or a calibration pattern with a vertical line may be used according to types of parameters, which will be further described below.

The calibration pattern may be a pattern in which patterns (e.g., linear patterns) included in one or more source images are combined. For example, the calibration pattern may be a pattern in which some of patterns of source images corresponding to viewpoints other than the reference viewpoint are combined based on a pattern of a source image corresponding to the reference viewpoint. The calibration pattern may include the entire pattern of the source image corresponding to the reference viewpoint, and a portion of a pattern of a source image corresponding to a viewpoint (e.g., an (i−1)-th viewpoint and an (i+1)-th viewpoint) adjacent to the reference viewpoint (e.g., an i-th viewpoint). A pattern of a source image corresponding to a viewpoint (e.g., the first viewpoint and the n-th viewpoint) relatively farther away from the reference viewpoint in the calibration pattern may be included less than a pattern of a source image corresponding to a viewpoint adjacent to the reference viewpoint. The human eyes recognize a focused area more clearly and its neighboring area unclearly, and the calibration pattern set based on the eyebox corresponding to the human eyes may be a pattern in which linear patterns of the source images at respective viewpoints are combined by mimicking the phenomenon. Accordingly, linear patterns corresponding to the reference viewpoint may be represented relatively clearly in the images 431 to 439 observed at respective viewpoints as described above, and linear patterns corresponding to a neighboring viewpoint and a relatively far viewpoint may be represented relatively unclearly.

The parallax optical element 421 may convert the pattern image into a 3D image using an autostereoscopic scheme. The parallax optical element 421 may include optical layers, for example, a lenticular lens array, a parallax barrier, and a directional backlight unit. Although FIG. 4 illustrates the parallax optical element 421 being positioned on the front surface of the display panel 422 as an example of the lenticular lens array and the parallax barrier for convenience, the parallax optical element 421 may also be positioned on the rear surface of the display panel 422 like the directional backlight unit.

The parallax optical element 421 may assign directivity to light provided to the display panel 422 or output from the display panel 422. Different images may be projected to a plurality of viewpoints (e.g., viewpoints corresponding to both eyes of a viewer) through the directional light, and the viewer may feel a 3D effect. When different images are not accurately projected to both eyes of the user in an autostereoscopic scheme, crosstalk may occur in a 3D image. For example, when an error occurs between a design value and an actual value of a parameter of the electronic device 420 in a production process or an installation process of the electronic device 420, such crosstalk may occur.

For reference, an image corresponding to a first pattern image generated by rendering one or more source images including a first source image may be observed at a first viewpoint, and an image corresponding to an n-th pattern image generated by rendering one or more source images including an n-th source image may be observed at an n-th viewpoint. The first observed image 431 may be an image observed when light corresponding to the first pattern image passes through the parallax optical element 421 and reaches the first viewpoint. The n-th observed image 439 may be an image observed when light corresponding to the n-th pattern image passes through the parallax optical element 421 and reaches the n-th viewpoint. A pattern image corresponding to one viewpoint (e.g., a reference viewpoint) may be displayed in portions of the display panel 422 through which light directed to the viewpoint passes. For example, in the pattern image, a calibration pattern may be expressed to be divided into portions of the display panel 422 through which light directed to the reference viewpoint passes. The light corresponding to the divided portions of the calibration pattern may be combined at the reference viewpoint while passing through the parallax optical element 421, whereby the user may observe the calibration pattern at the reference viewpoint. For reference, the reference viewpoint may be a viewpoint corresponding to a first eye (e.g., a left eye), and an eyebox may include the reference viewpoint and another viewpoint paired with the reference viewpoint (e.g., a viewpoint corresponding to a second eye that is a right eye).

According to an example embodiment, the electronic device 420 may detect a position of a reference eye of a user. For example, the electronic device 420 may detect a position of an eye of a user through a separate camera (e.g., the eye detector 217 of FIG. 2) installed in the electronic device 420 or around the electronic device 420. The electronic device 420 may perform rendering so that the pattern image may be observed from a reference viewpoint corresponding to the detected position of the eye of the user.

Figure 5A:
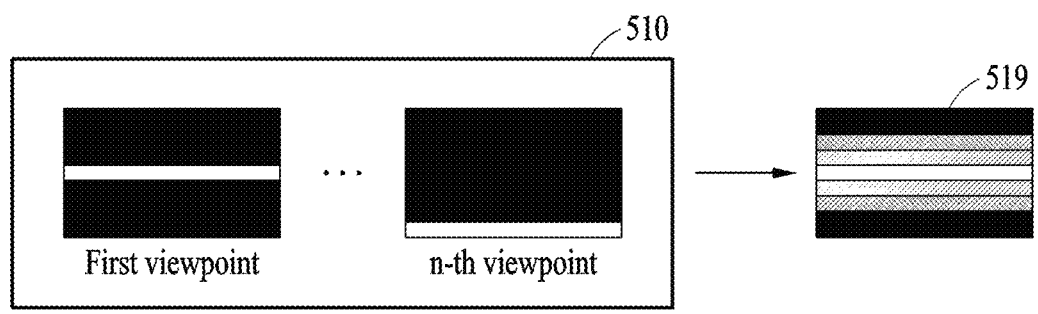
FIGS. 5A and 5B illustrate source images and observed images according to an example embodiment.
Figure 5B:
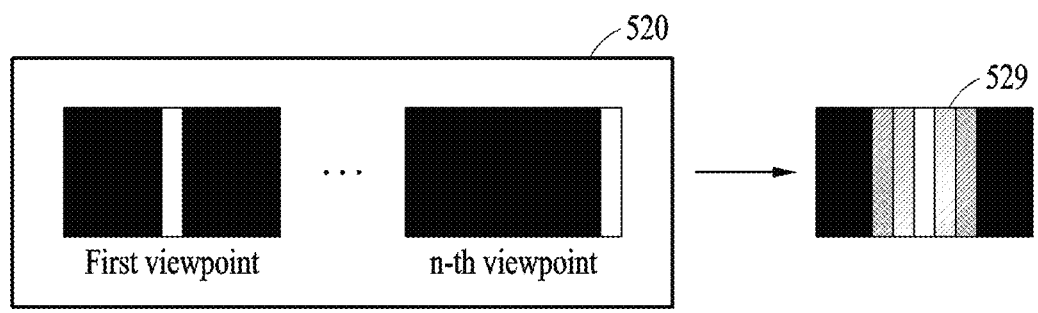

FIGS. 5A and 5B illustrate source images and observed images according to an example embodiment.

First source images 510 and second source images 520 may correspond to a plurality of viewpoints (e.g., a first viewpoint to an n-th viewpoint). Each of the first source images 510 may include a linear pattern with a horizontal line at a different position based on a corresponding viewpoint. Each of the second source images 520 may include a linear pattern with a vertical line at a different position based on a corresponding viewpoint. The first source images 510 may be used to generate a first pattern image, and the second source images 520 may be used to generate a second pattern image. For example, an electronic device may render one or more source images including a first source image corresponding to an i-th viewpoint for calibration at the i-th viewpoint, using parameters of a parallax optical element, to generate a first pattern image corresponding to the i-th viewpoint. Here, i denotes an integer greater than or equal to "1" and less than or equal to "n". In another example, the electronic device may render one or more source images including a second source image corresponding to the i-th viewpoint, using parameters of the parallax optical element, to generate a second pattern image corresponding to the i-th viewpoint.

For reference, in calibrating an individual parameter among a plurality of parameters, there may exist a calibration pattern that is easy to determine whether the corresponding parameter is calibrated. The first source images 510 may include black regions in the remaining regions except for the horizontal lines. The second source images 520 may include black regions in the remaining regions except for the vertical lines. The first source images 510 may be used to facilitate calibration of a pitch parameter, and the second source images 520 may be used to facilitate calibration of a slanted angle parameter. A linear pattern of a source image corresponding to a reference viewpoint, among the source images, may be changed to a color (e.g., green) different from a color (e.g., white) of a linear pattern at another viewpoint.

The electronic device (e.g., the electronic device 300 of FIG. 3) may generate a pattern image through light field rendering so that the source image corresponding to the reference viewpoint may be expressed at the reference viewpoint. In FIGS. 5A and 5B, an example in which the reference view is a first viewpoint and a pattern image is rendered with respect to the first viewpoint is described. When it is assumed that a pattern image is output in a state in which parameter calibration is completed, a user may view a first observed image 519 and a second observed image 529 at a reference viewpoint. In an ideal environment, the first observed image 519 and the second observed image 529 should each be the same as a calibration pattern in which source images are combined corresponding to a reference viewpoint. However, in an actual environment where crosstalk exists, the calibration pattern corresponding to the reference viewpoint in each of the observed images 519 and 529 may be observed in a form with a gradation or in a form of being more blurred. For reference, an example of rendering using a calibrated parameter is described with reference to FIGS. 5A and 5B, and a calibration pattern with a horizontal line (e.g., a horizontal line having a thickness and being blurred) was observed in the first observed image 519, and a calibration pattern with a vertical line (e.g., a vertical line having a thickness and being blurred) was observed in the second observed image 529. If calibration is yet to be completed, each linear calibration pattern may be observed as an oblique linear pattern rather than a vertical or horizontal line. Parameters for aligning the calibration pattern described above will be described below with reference to FIG. 6.

Figure 6:
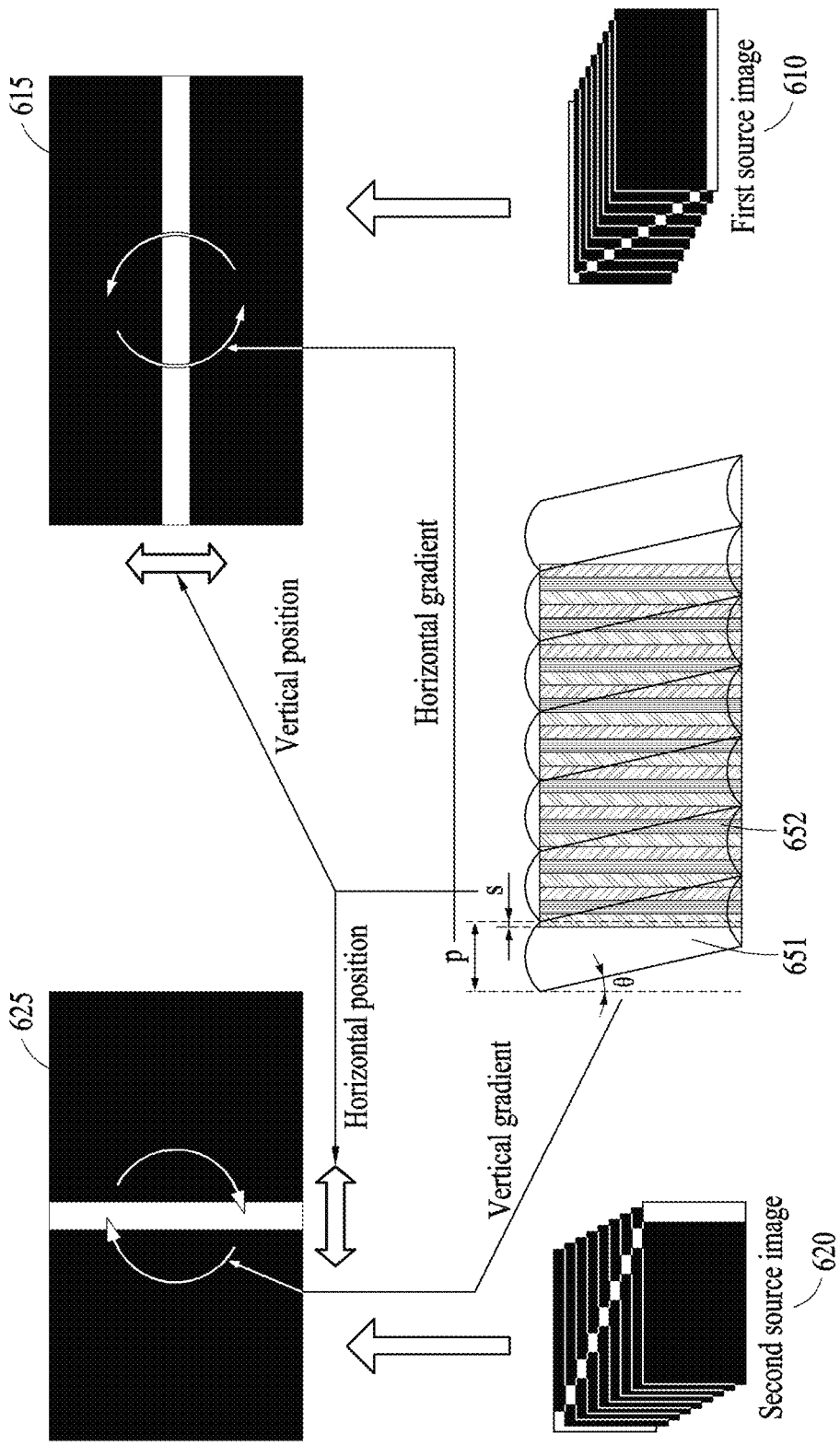
FIG. 6 illustrates parameters of a parallax optical element according to an example embodiment.

FIG. 6 illustrates parameters of a parallax optical element according to an example embodiment.

A first observed image 615 based on a first source image 610 may be viewed by a user, and a second observed image 625 based on a second source image 620 may be obtained. For reference, unlike the example of FIGS. 5A and 5B in which crosstalk is included, FIG. 6 illustrates the first observed image 615 and the second observed image 625 in the form being observed in a state in which calibration is completed and in an ideal environment in which crosstalk is absent, for convenience.

A parameter of an electronic device (e.g., the electronic device 300 of FIG. 3) may also be referred to as a "parameter of a parallax optical element 651 (e.g., the parallax optical element 320 of FIG. 3). Parameters of the parallax optical element 651 may include a pitch parameter, a slanted angle parameter, and a position offset parameter. It is assumed that of the parameters of the parallax optical element 651, a thickness is fixed.

The pitch parameter may be a parameter indicating a pitch p of a unit element of the parallax optical element 651. The parallax optical element 651 may include unit elements. A unit element is a unit optical element that assigns a directivity to light corresponding to an image output through a display 652, and may include, for example, a slit of a parallax barrier and a unit lens of lenticular lenses. The unit elements may be periodically arranged along one axis on a plane corresponding to an optical layer disposed on one surface of the display 652. The pitch parameter may indicate an interval of a periodic arrangement of unit elements. In FIG. 6, the pitch parameter may indicate a horizontal period of the unit element. A length of an interval in which a view is iterated in a 3D image may be determined based on a pitch p. Using the pitch parameter, a gradient (e.g., a horizontal gradient) of a linear pattern (e.g., a reference line) in the first observed image 615 may be adjusted. For example, through adjustment of the pitch parameter, a linear calibration pattern corresponding to a pattern image may be rotated.

The slanted angle parameter may indicate a gradient of a unit element of the parallax optical element 651 relative to a reference axis of the display 652. In FIG. 6, the reference axis of the display 652 is illustrated as a vertical axis, and a slanted angle $\theta$ may indicate a gradient of a unit element formed with respect to the vertical axis. Using the slanted angle parameter, a gradient of a linear pattern in the second observed image 625 may be adjusted.

The position offset parameter may indicate a relative position between the parallax optical element 651 and the display 652. For example, the position offset parameter may indicate a position offset s between a start position of a unit element and a position of a start pixel of the display 652. In FIG. 6, the position offset s is illustrated as a horizontal offset between a start pixel on the upper left end of the display 652 and a start position of a unit element on the left side. Using the position offset parameter, the electronic device may adjust a vertical position of the linear pattern in the first observed image 615 and a horizontal position of the linear pattern in the second observed image 625. However, although the position offset s is described based on the start pixel on the upper left end in FIG. 6 for ease of description, embodiments are not limited thereto. The start pixel for the position offset s may also be set to the center of the display 652. As described below, when the start pixel is set to the center of the display 652, only the pitch parameter among the parameters of the parallax optical element may change when the temperature changes. When the start pixel is set to the upper left end of the display 652, the position offset parameter and the pitch parameter among the parameters of the parallax optical element may change when the temperature changes.

According to an example embodiment, a processor of the electronic device may be configured to provide a user with one of or a combination of two or more of a first pattern image corresponding to a pitch parameter, a second pattern image corresponding to a slanted angle parameter, and a third pattern image corresponding to a position offset parameter. The first pattern image may be generated based on first source images each including a horizontal line. The second pattern image may be generated based on second source images each including a vertical line. The third pattern image may be generated as a calibration pattern including one of a vertical line and a horizontal line. As further discussed below, the pitch parameter may be calibrated independently of other parameters based on a horizontal pattern. Also, if the pitch parameter is calibrated, the slanted angle parameter may be calibrated independently of other parameters based on a vertical pattern. The electronic device may simultaneously provide two or more of the first pattern image, the second pattern image, and the third pattern image, or may sequentially provide the first pattern image, the second pattern image, and the third pattern image one by one. For reference, although described below, an operation of calibrating and/or adjusting a position offset parameter using a third pattern image after a pitch parameter and a slanted angle parameter are calibrated and/or adjusted will be mainly described herein, and a pattern image described below may be mainly a third pattern image for calibration of the position offset parameter. As described below, since the pitch parameter mainly changes when the temperature changes, the electronic device may provide the first pattern image corresponding to the pitch parameter.

Calibration according to an example embodiment may refer to an operation of adjusting a parameter of a parallax optical element so that a reference line of an observed image corresponding to a pattern image is positioned vertically or horizontally at the center of the image. For example, a reference line in the first observed image 615 may be positioned horizontally at the center of the image by calibration. As another example, a reference line in the second observed image 625 may be positioned vertically at the center of the image by calibration. Manual or automatic calibration using the calibration pattern described above may be performed based on a reference temperature (e.g., room temperature of 20° C.), and may also be referred to as light field (LF) calibration.

A sequential calibration process using a horizontal pattern and a vertical pattern may be efficiently performed at a relatively low resolution in comparison to a calibration process using other complex patterns such as a check pattern. This is because calibration using a horizontal pattern and calibration using a vertical pattern are performed separately, which simplifies the calibration task. The autostereoscopic 3D imaging technology may be implemented in a low-resolution device such as an HUD. An HUD may have a relatively long viewing distance and a resolution that is insufficient for estimating a parameter using a single pattern image, in comparison to a general display device. Also, due to a catadioptric system included in the HUD device, distortion may occur in a 3D image. The calibration according to an example embodiment is sequentially performed through a simple pattern and thus, may exhibit high performance even in such a low-resolution device or a device including an optical system.

Figure 7A:
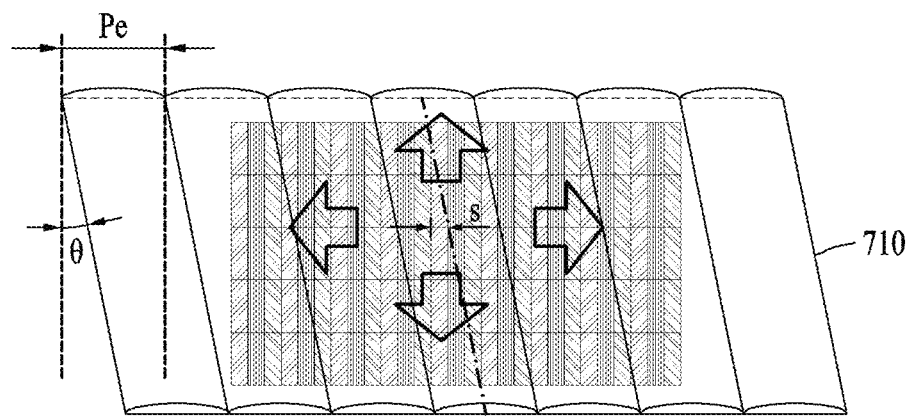
FIGS. 7A and 7B illustrate changes in a parallax optical element with respect to a temperature according to an example embodiment.
Figure 7B:
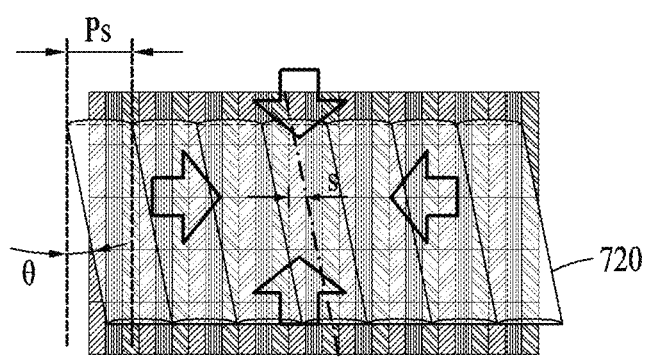

FIGS. 7A and 7B illustrate changes in a parallax optical element with respect to a temperature according to an example embodiment.

According to an example embodiment, an electronic device (e.g., the electronic device 300 of FIG. 3) may include a glasses-free 3D display using a parallax optical element (e.g., the parallax optical element 320 of FIG. 3, which is a lenticular lens array or a parallax barrier). A combination of the display and the parallax optical element may also be referred to as an HUD (e.g., the HUD 213 of FIG. 2). A structure in which a lenticular lens array is disposed on a display panel (e.g., the display 310 of FIG. 3) is illustrated in FIGS. 7A and 7B.

The electronic device may render an image using a parameter obtained based on calibration (e.g., LF calibration) at a reference temperature (e.g., room temperature of 20° C.) with respect to the lenticular lens array. However, the shape of the lenticular lens array disposed on the display panel may change according to a temperature change. When the shape of the lenticular lens array changes, the directivity of image rays with respect to individual positions of an eyebox may deviate. Even if the same image is output from the display panel, an image (e.g., an observed image) in which image rays reaching the eyebox are combined may be distorted according to a temperature change. For example, the parameter obtained based on the calibration at the reference temperature may have an error at a temperature other than the reference temperature. For example, in the case of a vehicular HUD, the vehicle is located outdoors rather than indoors, a parallax optical element may undergo severe temperature changes. For example, a vehicle interior air temperature may reach 100° C. in summer and −40° C. in winter. As the temperature change increases, a shape change and a calibration error of the parallax optical element may increase. Although a vehicular HUD is mainly described herein, example embodiments are not limited thereto, and the description may also apply to a glasses-free 3D display (e.g., a 3D TV or a 3D tablet).

For example, when an internal temperature of the electronic device increases, the lenticular lens array may expand as shown in FIG. 7A. The lenticular lens array may expand in all directions (e.g., upward, downward, leftward, and rightward). A pitch parameter of an expanding lenticular lens array 710 may be denoted by Pe. When the internal temperature of the electronic device decreases, the lenticular lens array may shrink in all directions as shown in FIG. 7B. A pitch parameter of a shrinking lenticular lens array 720 may be denoted by Ps. The lenticular lens array expands and shrinks according to the temperature change described above, but the size of the display panel may remain the same. For example, the parallax optical element (e.g., the lenticular lens array) may expand or shrink in comparison to the display panel according to a temperature change.

Herein, an example of a position offset being set based on the center of the display panel will be mainly described. When the lenticular lens array expands or shrinks based on the center of the display panel, a slanted angle parameter and a start position parameter among the parameters of the lenticular lens array may not change despite a temperature change, as shown in FIGS. 7A and 7B. Only a pitch parameter may be P at the reference temperature, increase to Pe upon expansion, and decrease to Ps upon shrinkage. Accordingly, only the pitch parameter needs to be corrected in response to a temperature change. The electronic device may build a parameter calibration model for modeling correction information for a pitch parameter for each temperature. The electronic device may correct, using the parameter calibration model, the pitch parameter that causes an error according to a temperature change inside the electronic device (e.g., inside the HUD) in comparison to a calibration result obtained at the reference temperature.

However, embodiments are not limited thereto, and when the position offset is set based on a start pixel at an upper left end, the position offset parameter and the pitch parameter may change together due to the expansion or shrinkage of the parallax optical element described above. In this case, the electronic device may build a parameter calibration model (e.g., an offset calibration model) for modeling correction information for the position offset parameter as well as the parameter calibration model (e.g., a pitch calibration model) for modeling correction information for the pitch parameter for each temperature. The description of the pitch calibration model, which will be provided later, may identically or similarly apply to the offset calibration model. Furthermore, according to the design, the electronic device may individually build and use a parameter calibration model for each of a plurality of temperature ranges and for each of the pitch, the start position, and the slanted angle.

Accordingly, the electronic device may compensate for a deviation of the LF calibration described above according to a temperature change, without repeatedly performing the LF calibration for every temperature change. Hereinafter, a method to compensate for a parameter (e.g., a pitch parameter) set based on a reference temperature using correction information obtained in advance for each temperature, without the need for performing an operation (e.g., LF calibration) for obtaining a parameter of the parallax optical element for every temperature change will be described. The correction information for each temperature may be determined based on a parameter calibration model. The parameter calibration model may be a model for modeling a variance of a parameter according to a temperature change based on actual measurement, and may include, for example, a regression function and/or a lookup table (LUT).

Hereinafter, an operation of correcting a parameter (e.g., a pitch parameter or a start position parameter) obtained based on the calibration as described with reference to FIGS. 4 to 6 using a parameter calibration model obtained in advance for each temperature will be described.

Figure 8:
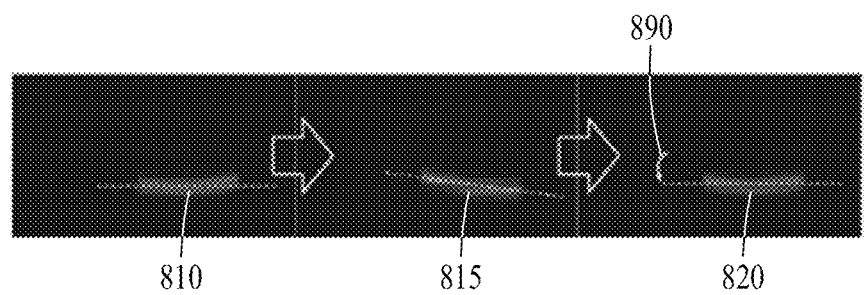
FIG. 8 illustrates changes in a calibration pattern with respect to a temperature and correction according to an example embodiment.

FIG. 8 illustrates changes in a calibration pattern with respect to a temperature and correction according to an example embodiment.

For example, referring to FIG. 8, an electronic device (e.g., the electronic device 100 of FIG. 3) may obtain a pitch parameter based on automatic calibration at a reference temperature (e.g., initial room temperature of 20° C.). The electronic device may render a pattern image using a pitch parameter (e.g., P) obtained based on LF calibration. In an observed image 810 corresponding to the rendered pattern image, a reference line of a calibration pattern may appear to be horizontal. Thereafter, when the temperature of a space accommodating a parallax optical element (e.g., a space inside a housing of the electronic device) rises to 60° C., the pitch of a lenticular lens array may vary as lenticular lenses expand as described above in FIGS. 7A and 7B. The pitch of the expanding lenticular lens array may be Pe, where Pe may be greater than P. When the electronic device renders and outputs a pattern image using the pitch parameter P, obtained at a reference temperature, at 60° C., an observed image 815 including an error may appear in an eyebox. As shown in FIG. 8, a calibration pattern, which should be a horizontal line, may be observed in the eyebox in the form rotated clockwise. That is because although rendering should have been performed using the pitch parameter Pe according to the expanding lenticular lens array at 60° C., rendering was performed using the smaller pitch parameter P.

When the electronic device renders and outputs a pattern image using the pitch parameter Pe obtained based on the calibration at 60° C., a corrected calibration pattern 820 may be observed in the eyebox as shown in FIG. 8. The pattern displayed using the pitch parameter Pe may include a reference line that is rotated in a counterclockwise direction 890 to be horizontal in comparison to the pattern displayed using the pitch parameter P.

Accordingly, the electronic device may determine the pitch parameter value Pe with respect to the measured temperature of 60° C., using the parameter calibration model, and perform parameter correction by replacing the default pitch parameter value P with the determined pitch parameter value Pe. The electronic device may render and output an image using the corrected pitch parameter value Pe.

Figure 9:
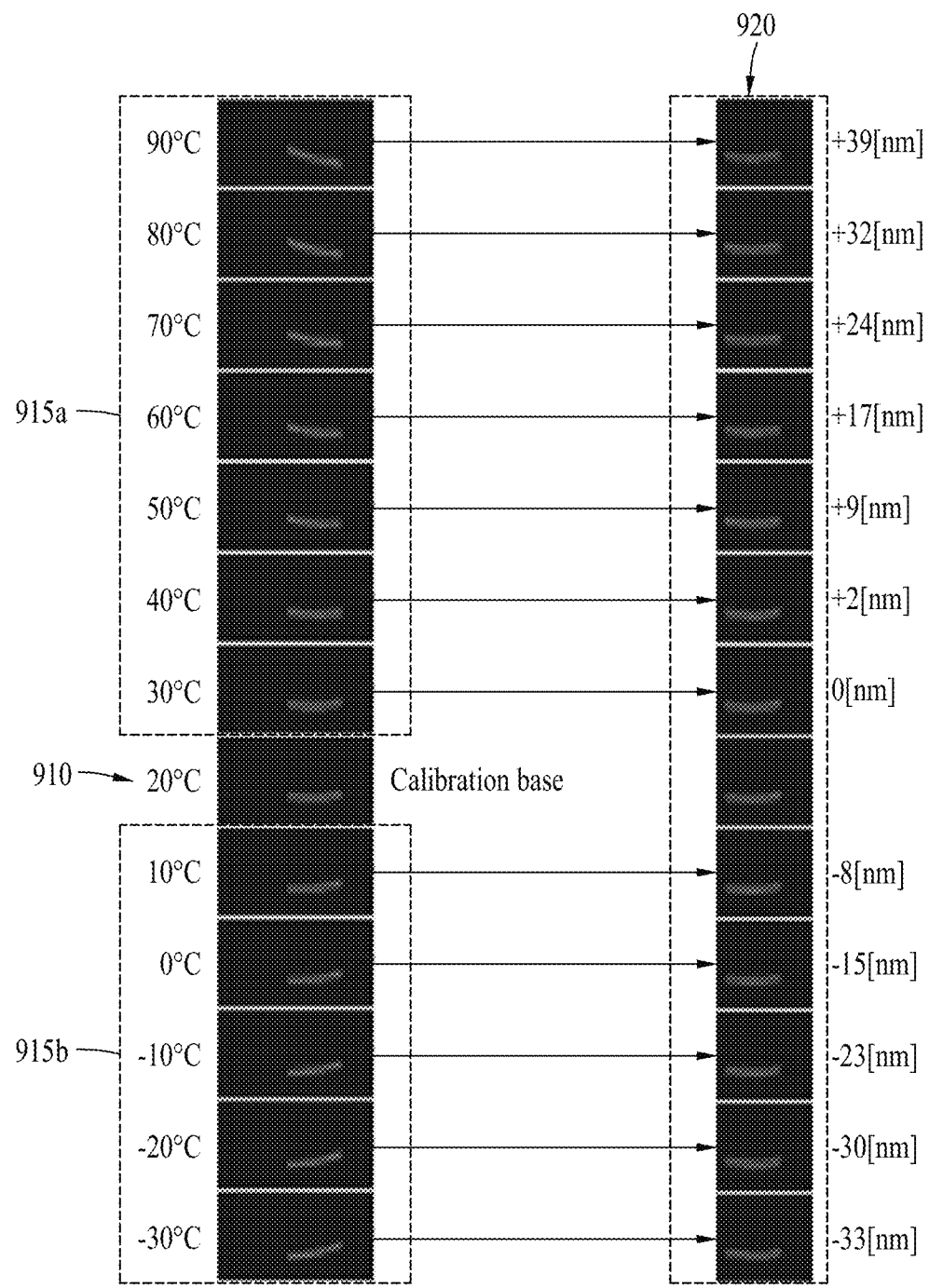
FIG. 9 illustrates correction information for each temperature for a parameter of a parallax optical element according to an example embodiment.

FIG. 9 illustrates correction information for each temperature for a parameter of a parallax optical element according to an example embodiment.

According to an example embodiment, a calibration system (e.g., the calibration system of FIG. 4) may include a temperature-changeable chamber and a camera installed at a position corresponding to an eyebox of an electronic device. The chamber may accommodate the electronic device and/or a parallax optical element of the electronic device. At least one surface of the chamber may include a transparent material (e.g., glass). An image ray passing through the parallax optical element may pass through the transparent surface of the chamber and be directed to the position corresponding to the eyebox. The camera of the calibration system may capture a combination of image rays passing through the parallax optical element and the chamber described above (e.g., an observed image). For example, the camera of the calibration system may capture a virtual image formed by an HUD of the electronic device. The calibration system may perform automatic calibration at room temperature (e.g., 20° C.). The automatic calibration has been described above with reference to FIGS. 4 to 6, and thus, a duplicate description will be omitted.

The calibration system may perform automatic calibration according to the temperature. In FIG. 9, an example in which the temperature of the chamber is changed at intervals of 10° C. from −30° C. to 90° C. is illustrated. Changing the temperature while a pitch parameter obtained based on calibration at a reference temperature of 20° C. is fixed, calibration patterns observed by the camera of the calibration system may be rotated according to the temperature change, as shown on the left side of FIG. 9. For example, calibration patterns 915a observed at 30° C. to 90° C. may be rotated clockwise in comparison to a reference calibration pattern 910 observed at a reference temperature of 20° C. As another example, calibration patterns 915b observed at 10° C. to −30° C. may be rotated counterclockwise in comparison to the reference calibration pattern 910. As shown in the drawing, as a difference from the reference temperature increases, the degree of rotation may also increase.

The calibration system may perform calibrations (e.g., LF calibrations) for individual temperatures. As shown on the right side of FIG. 9, reference lines of the calibration patterns may be horizontally aligned in a result 920 of performing automatic calibration according to each temperature. The result 920 may be a calibration pattern observed after the change from the reference parameter value P to the pitch parameter value Pe (or Ps) according to each temperature. In the example shown in FIG. 9, for example, the pitch parameter value obtained based on calibration at 90° C. may be 39 nanometers (nm) greater than the reference pitch value obtained at 20° C. As another example, the pitch parameter value obtained based on calibration at −30° C. may be 33 nm smaller than the reference pitch value obtained at 20° C. The aforementioned variances may be used as correction values for the reference parameter value (e.g., the reference pitch value), and an example of building (e.g., generating) a parameter calibration model (e.g., a regression model) for determining a correction value will be described below with reference to FIG. 10.

Figure 10:
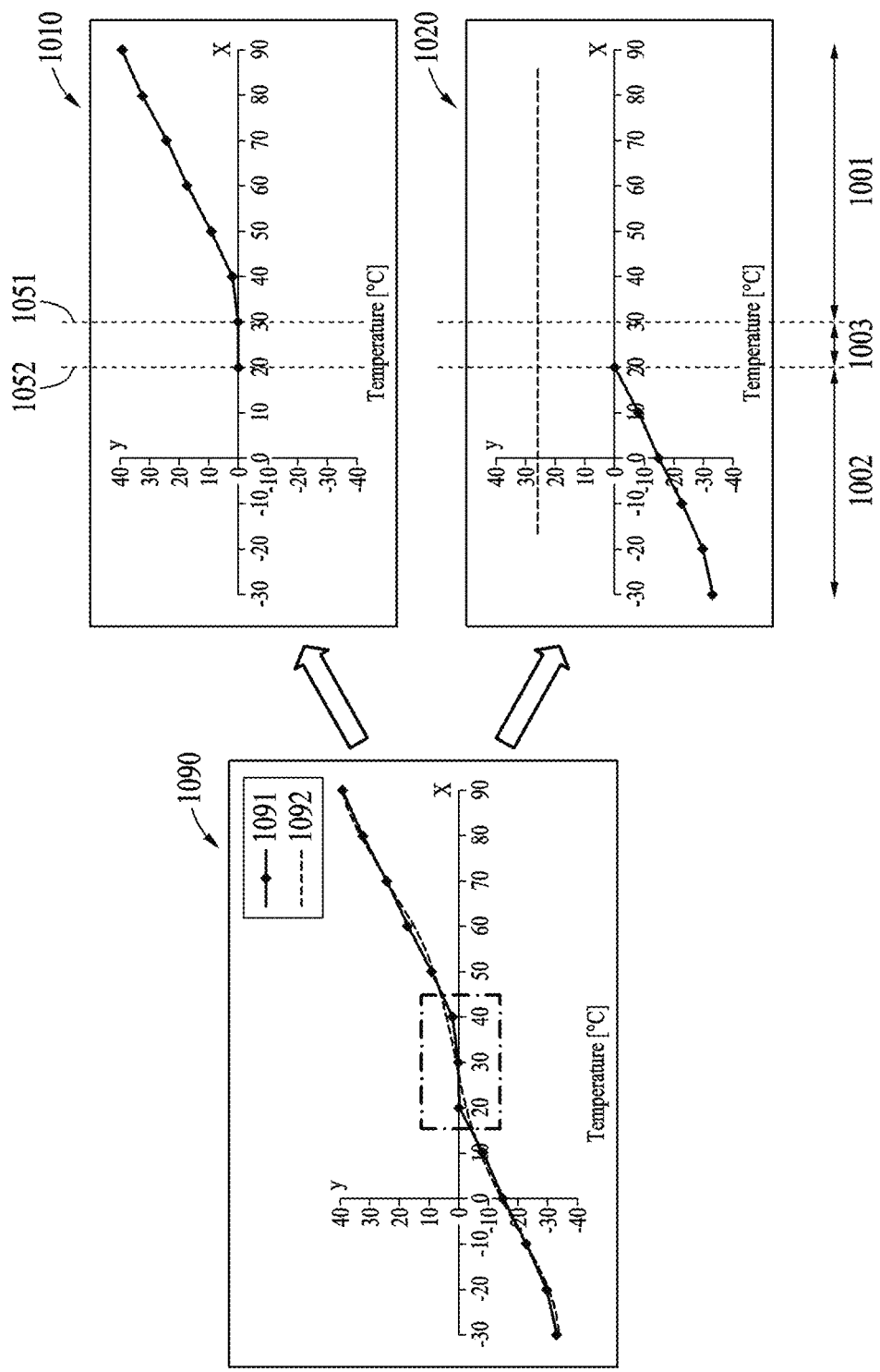
FIG. 10 is a diagram illustrating an example of a parameter calibration model for calibrating a parameter of a parallax optical element according to an example embodiment.

FIG. 10 is a diagram illustrating an example of a parameter calibration model for calibrating a parameter of a parallax optical element according to an example embodiment.

A calibration system (e.g., the calibration system 400 of FIG. 4) and/or an electronic device (e.g., the electronic device 300 of FIG. 3) may build a parameter calibration model based on correction information (e.g., a correction value) obtained for each reference temperature. The parameter calibration model may be a model representing correction information to be applied in comparison to a default parameter for each temperature. The calibration system and/or the electronic device may build and/or use a plurality of parameter calibration models. For reference, the unit of a correction value output by a parameter calibration model may be nm. A regression model generated in nm may exhibit a smaller error than a regression model generated in millimeters (mm).

For example, the plurality of parameter calibration models may include at least one of a function (e.g., a regression function) representing a relationship between correction information and a temperature obtained based on a regression analysis for reference parameter values, and mapping information related to correction information mapped for each predetermined temperature. For example, the mapping information may be information to which a correction value is mapped for each of the predetermined temperatures, and may be a lookup table representing a pitch correction value for each temperature. The electronic device may search for a temperature matching a measured temperature from the mapping information (e.g., the lookup table) and determine a correction value corresponding to the searched temperature. The electronic device may adjust a parameter (e.g., a pitch parameter) of a parallax optical element using the found correction value. For reference, parameter correction using a regression function will be mainly described herein. In FIG. 10 as well, regression functions are illustrated as examples of parameter calibration models, wherein an x-axis denotes temperature in degrees Celsius, and a y-axis denotes a correction value according to temperature in the unit of nm. Since a reference temperature is set to 20° C., the correction value is shown as "0" at 20° C. A regression function may be a fifth-order function, but example embodiments are not limited thereto.

A plurality of parameter calibration models may each be built based on reference parameter values obtained by performing calibration at two or more temperature values within a temperature range assigned to the corresponding model. In FIG. 10, an example of a parameter calibration model 1090 generated using correction values (e.g., reference correction values) obtained based on calibration for reference temperatures (e.g., −30° C., −20° C., −10° C., 0° C., 10° C., 20° C., 30° C., 40° C., 50° C., 60° C., 70° C., 80° C., and 90° C.) is illustrated. For example, the parameter calibration model 1090 may include a regression function determined based on a regression analysis using the reference correction values. However, as shown in FIG. 10, the total temperature range potentially occurring in the electronic device is from −30° C. to 90° C., and the regression function obtained based on the regression analysis for the total temperature range may have an error between a correction value 1091 that is actually required and an estimated regression function 1092, in a section between 15° C. and 45° C. Accordingly, the calibration system and/or the electronic device may build and use a plurality of parameter calibration models 1010 and 1020 by dividing the total temperature range into temperature sections.

According to an example embodiment, the plurality of parameter calibration models 1010 and 1020 may be assigned to different temperature ranges. For example, respective temperature ranges assigned to the plurality of parameter calibration models 1010 and 1020 may not overlap each other. For example, the first parameter calibration model 1010 may be assigned to a first temperature range, and the second parameter calibration model 1020 may be assigned to a second temperature range. The first temperature range and the second temperature range may not overlap each other. In the example shown in FIG. 10, the first temperature range may be a high temperature range between 20° C. and 90° C., inclusive, and the second temperature range may be a low temperature range between −30° C. and 20° C., inclusive. The first temperature range and the second temperature range may be determined based on a reference temperature.

The reference temperature may be determined based on a temperature section in which the parameter of the parallax optical element changes non-linearly. For example, the reference temperature may be determined to be one of temperatures belonging to the temperature section in which the parameter of the parallax optical element changes non-linearly. The parallax optical element may maintain the parameter in a stability temperature region (e.g., between 20° C. and 40° C., inclusive), and represent a parameter that changes in a high temperature range (e.g., exceeding 40° C.) and a low temperature range (e.g., below 20° C.) that deviate from the stability temperature region. For example, since the parameter of the parallax optical element does not change significantly in the stability temperature region, the stability temperature region may be interpreted as a non-linearly changing section. Even in the example shown in FIG. 10, the correction value for the pitch parameter of the parallax optical element may change linearly in a temperature section of greater than or equal to −30° C. and less than 20° C. and a temperature section of greater than 40° C. and less than or equal to 90° C., and the pitch parameter may not change or change significantly in a temperature section between 20° C. and 40° C., inclusive. For example, the reference temperature may be one of temperature values between 20° C. and 30° C., inclusive, and FIG. 10 illustrates an example of the reference temperature being determined to be 20° C.

As described above, the electronic device may determine correction information (e.g., a correction value) with respect to a measured temperature using a parameter calibration model built for each temperature section. For example, the electronic device may determine correction information using the first parameter calibration model 1010 based on the measured temperature exceeding the reference temperature. The electronic device may determine the correction information using the first parameter calibration model 1010 for the first temperature range based on the measured temperature belonging to the first temperature range exceeding the reference temperature. As another example, the electronic device may determine correction information using the second parameter calibration model 1020 based on a measured temperature being less than or equal to the reference temperature. The electronic device may determine the correction information using the second parameter calibration model 1020 for the second temperature range based on the measured temperature belonging to the second temperature range being less than or equal to the reference temperature.

The electronic device may determine a correction value corresponding to the measured temperature using one of the first parameter calibration model 1010 and the second parameter calibration model 1020. For example, when the measured temperature is 50° C., the electronic device may determine the correction value to be +9 nm using the first parameter calibration model 1010. As another example, when the measured temperature is 0° C., the electronic device may determine the correction value to be −15 nm. The electronic device may obtain a corrected parameter value by applying (e.g., adding) the determined correction value to a default parameter (e.g., a default pitch value). The electronic device may provide content to an eyebox by rendering and outputting an image using the corrected parameter value.

Furthermore, at least one of the plurality of parameter calibration models 1010 and 1020 may be built based on reference parameter values obtained at first temperature intervals in a non-linear temperature section of a temperature range assigned to the at least one model and reference correction values obtained at second temperature intervals, being wider than the first temperature intervals, in another temperature section. FIG. 10 shows an example of reference parameter values being measured at equal temperature intervals, and the reference parameter values may be measured with higher density in a non-linear temperature section (e.g., the temperature section between 30° C. and 50° C. and the temperature section between 10° C. and 30° C. in the example of FIG. 10) than in another temperature section. Accordingly, a parameter calibration model that may output a more precise correction value in the non-linear temperature section may be built.

According to another example embodiment, a memory of the electronic device may store a first parameter calibration model for a high temperature 1001 exceeding a default temperature upper limit 1051, a second parameter calibration model for a low temperature 1002 being less than or equal to a default temperature lower limit 1052, and a third parameter calibration model for a default temperature range 1003 between the default temperature upper limit 1051 and the default temperature lower limit 1052. For example, a processor of the electronic device may select one of the first parameter calibration model, the second parameter calibration model, and the third parameter calibration model based on a measured temperature, and determine correction information corresponding to the measured temperature using the selected model. In FIG. 10, the default temperature range may be defined as a temperature range greater than the default temperature lower limit and less than or equal to the default temperature upper limit, where the default temperature upper limit may be 30° C., and the default temperature lower limit may be 20° C.

Figure 11:
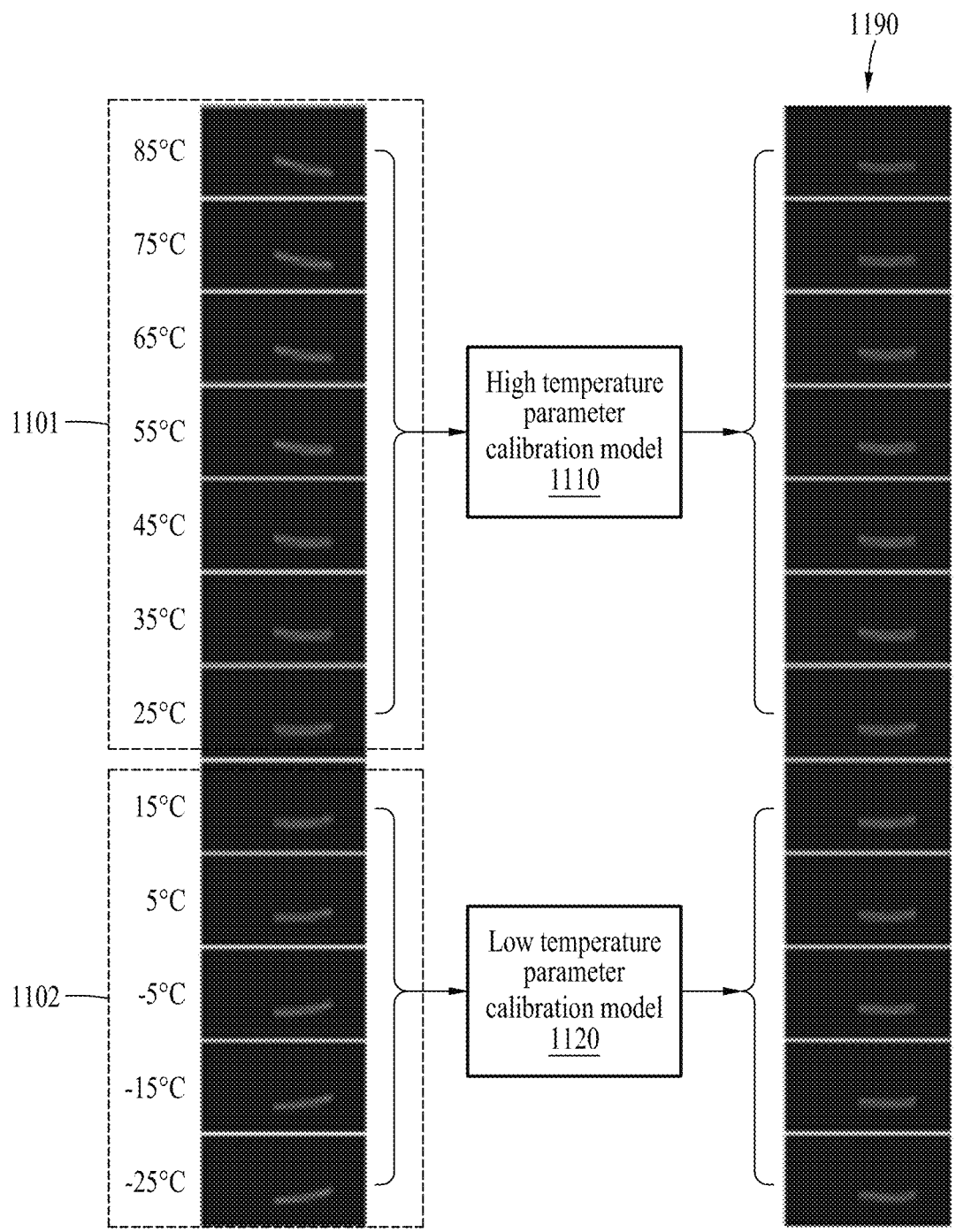
FIG. 11 illustrates a high temperature parameter calibration model and a low temperature parameter calibration model according to an example embodiment.

FIG. 11 illustrates a high temperature parameter calibration model and a low temperature parameter calibration model according to an example embodiment.

A processor of an electronic device (e.g., the electronic device 300 of FIG. 3) may obtain a correction value for a pitch as correction information, and perform parameter correction by applying the correction value to a pitch parameter value of a parallax optical element. For example, FIG. 11 illustrates parameter correction using parameter calibration models generated based on reference parameter values measured for reference temperature values in units of 10° C. In the example shown in FIG. 11, a high temperature parameter calibration model 1110 (e.g., the first parameter calibration model of FIG. 10) may be used for 25° C., 35° C., 45° C., 55° C., 65° C., 75° C., and 85° C., and a low temperature parameter calibration model 1120 may be used for 15° C., 5° C., −5° C., −15° C., and −25° C. Although images 1101 observed at high temperatures exhibit rotated patterns as shown in FIG. 11, the electronic device may display aligned patterns 1190 by applying correction values determined based on a high temperature parameter calibration model 1110. Similarly, although images 1102 observed at low temperatures exhibit rotated patterns, the electronic device may display aligned patterns 1190 by applying correction values determined based on a low temperature parameter calibration model 1120.

For example, the parameter calibration models may be mounted on a light field rendering (LFR) board. The electronic device may input an HUD internal temperature value measured by a temperature sensor to the LFR board. The LFR board may calculate a correction value in nm by applying the input temperature to a regression model corresponding to the input temperature among the parameter calibration models. The electronic device may obtain a corrected parameter according to the following equation: $Pc(x)=P+\Delta p(x)\times10^{-6}$. Here, P denotes a default pitch value obtained based on calibration with respect to a reference temperature (e.g., room temperature of 20° C.). $\Delta p(x)$ denotes a pitch correction value to be applied to the default pitch value at a temperature of x° C. $Pc(x)$ denotes a corrected pitch value at a temperature of x° C. Here, the unit of $\Delta p(x)$ is nm and thus, may be converted to mm. For example, even if an HUD optical system and a panel are changed, the parameter correction for the parallax optical element according to the temperature described above may be possible.

Figure 12A:
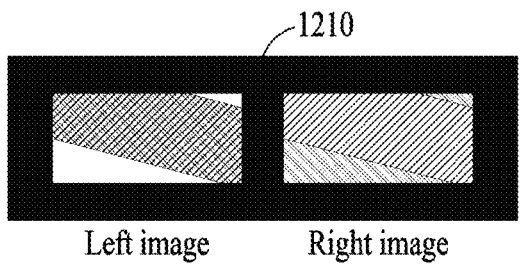
FIGS. 12A and 12B illustrate parameter adjustment results according to an example embodiment.
Figure 12B:
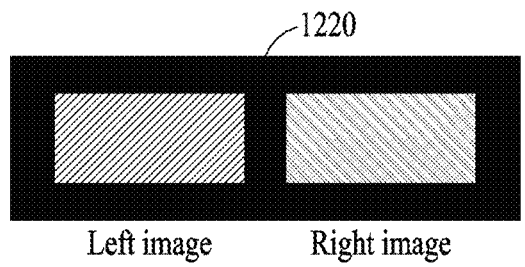

FIGS. 12A and 12B illustrate parameter adjustment results according to an example embodiment.

A portion of content of each other may be included in left and right images 1210 before calibration of a parallax optical element is completed. When calibration of the parallax optical element is completed, content of each other may be displayed separately in left and right images 1220. For example, crosstalk may be eliminated.

According to an example embodiment, when a calibration completion input is received from a user, a processor may store parameters of the parallax optical element that are personalized to the user. An electronic device may render a content image using the personalized parameters and output the content image to a display. Through a feedback of a calibration pattern and an interface as described above with reference to FIGS. 4 to 11, the user may intuitively and manually adjust parameters of the parallax optical element more easily.

Figure 13:
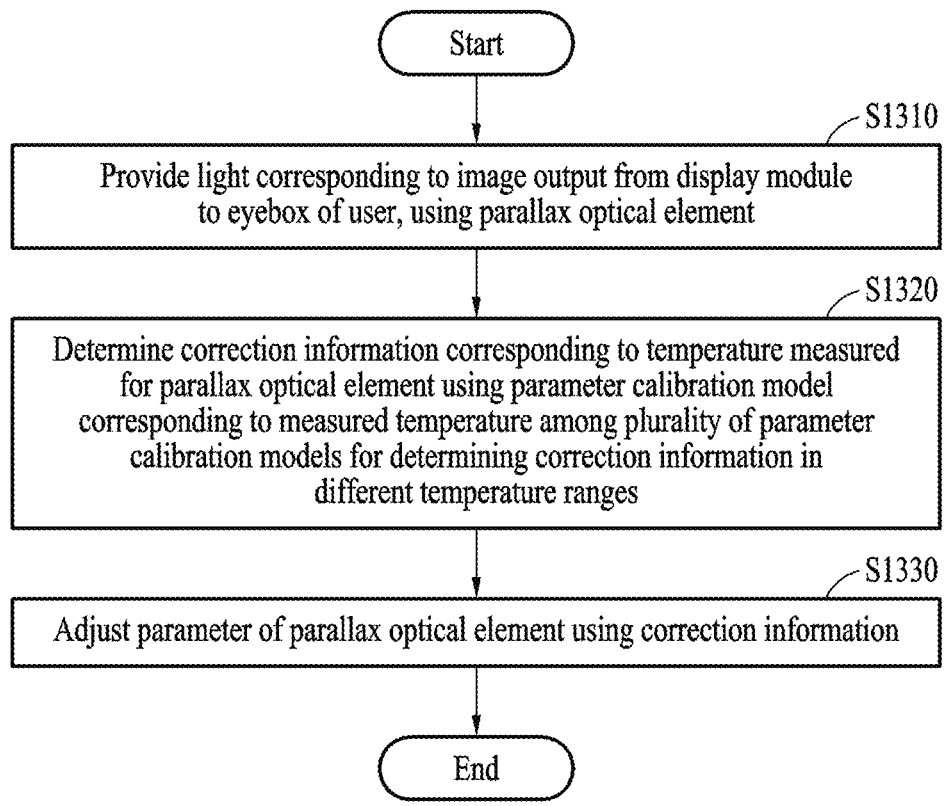
FIG. 13 is a flowchart illustrating a parameter correction method according to an example embodiment.

FIG. 13 is a flowchart illustrating a parameter correction method according to an example embodiment.

First, an electronic device may provide light corresponding to an image output from a display to an eyebox of a user, using a parallax optical element (S1310). Although a lenticular lens array is mainly described as a parallax optical element herein, example embodiments are not limited thereto. The same or similar operation and design may apply to various HUD devices with a light source applied in the form of a slit to a backlight of a flat display panel or a parallax barrier.

The electronic device may determine correction information corresponding to a temperature measured for the parallax optical element using a parameter calibration model corresponding to the measured temperature among a plurality of parameter calibration models for determining correction information in different temperature ranges (S1320).

The electronic device may adjust a parameter of the parallax optical element using the correction information (S1330).

However, operations of the electronic device are not limited to those described with reference to FIG. 13, and may be performed along with at least one of the operations described above with reference to FIGS. 1 to 12 in time-series manner and/or in parallel.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

While embodiments have been described with reference to the figures, it will be understood by those of ordinary skill in the art that various changes in form and details may be made therein without departing from the spirit and scope as defined by the following claims and their equivalents.

What is claimed is:

1. An electronic device comprising:
   a display;
   a parallax optical element configured to provide light corresponding to an image output from the display to an eyebox of a user;
   a temperature sensor configured to measure a temperature around the parallax optical element;
   a memory configured to store a plurality of parameter calibration models for determining correction information configured to correct a parameter of the parallax optical element corresponding to a plurality of temperature ranges, respectively; and
   a processor configured to:
     determine correction information corresponding to the measured temperature based on a parameter calibration model corresponding to the measured temperature among the plurality of parameter calibration models, and
     adjust the parameter of the parallax optical element based on the correction information,
   wherein the plurality of temperature ranges corresponding to the plurality of parameter calibration models are different from each other, and
   wherein each temperature range among the plurality of temperature ranges comprises a plurality of temperature values corresponding to measured temperature values that are respectively input to parameter calibration model corresponding to the temperature range for determining the correction information.

2. The electronic device of claim 1, wherein the processor is further configured to:
   determine the correction information based on a first parameter calibration model corresponding to a first temperature range based on the measured temperature included in the first temperature range being greater than a reference temperature; and
   determine the correction information based on a second parameter calibration model corresponding to a second temperature range based on the measured temperature included in the second temperature range being less than or equal to the reference temperature.

3. The electronic device of claim 2, wherein the reference temperature is determined based on a temperature section in which the parameter of the parallax optical element changes non-linearly,
   wherein the processor is further configured to:

based on the measured temperature being greater than the reference temperature, determine the correction information based on the first parameter calibration model; and based on the measured temperature being less than or equal to the reference temperature, determine the correction information based on the second parameter calibration model.

4. The electronic device of claim 3, wherein a value of the reference temperature is in a range of 20° C. to 30° C.

5. The electronic device of claim 1, wherein the memory is further configured to store a first parameter calibration model corresponding to a first temperature that is greater than a default temperature upper limit, a second parameter calibration model corresponding to a second temperature that is less than or equal to a default temperature lower limit, and a third parameter calibration model corresponding to a default temperature range between the default temperature upper limit and the default temperature lower limit, and wherein the processor is further configured to:
select one of the first parameter calibration model, the second parameter calibration model, and the third parameter calibration model based on the measured temperature, and
determine the correction information corresponding to the measured temperature based on the selected model.

6. The electronic device of claim 1, wherein each of the plurality of parameter calibration models is built based on reference parameter values obtained by performing calibration at two or more temperature values within a temperature range corresponding to a model among the plurality of parameter calibration models.

7. The electronic device of claim 6, wherein each of the plurality of parameter calibration models comprise at least one of a function representing a relationship between correction information and a temperature obtained based on a regression analysis corresponding to the reference parameter values, and mapping information corresponding to correction information mapped for each predetermined temperature.

8. The electronic device of claim 6, wherein at least one of the plurality of parameter calibration models is built based on reference parameter values obtained at first temperature intervals in a non-linear temperature section of a temperature range corresponding to the at least one of the plurality of parameter calibration models and reference correction values obtained at second temperature intervals, being wider than the first temperature intervals, in a temperature section other than the non-linear temperature section.

9. The electronic device of claim 1, wherein the processor is further configured to:
obtain a correction value corresponding to a pitch as the correction information, and
perform parameter correction by applying the correction value to a pitch parameter value of the parallax optical element.

10. A parameter correction method performed by a processor, the parameter correction method comprising:
providing, via a parallax optical element, light corresponding to an image output from a display to an eyebox of a user;
determining correction information corresponding to a temperature range, among a plurality of temperature ranges, including a temperature measured for the parallax optical element based on a parameter calibration model corresponding to the measured temperature among a plurality of parameter calibration models for determining correction information in different temperature ranges; and
adjusting a parameter of the parallax optical element based on the correction information,
wherein the plurality of temperature ranges corresponding to the plurality of parameter calibration models are different from each other, and
wherein each temperature range among the plurality of temperature ranges comprises a plurality of temperature values corresponding to measured temperature values that are respectively input to parameter calibration model corresponding to the temperature range for determining the correction information.

11. The parameter correction method of claim 10, wherein the determining of the correction information comprises:
determining the correction information based on a first parameter calibration model corresponding to a first temperature range based on the measured temperature included in the first temperature range exceeding a reference temperature; and
determining the correction information based on a second parameter calibration model corresponding to a second temperature range based on the measured temperature included in the second temperature range being less than or equal to the reference temperature.

12. The parameter correction method of claim 11, wherein the reference temperature is determined based on a temperature section in which the parameter of the parallax optical element changes non-linearly,
wherein the determining of the correction information further comprises:
based on the measured temperature being greater than the reference temperature, determining the correction information based on the first parameter calibration model; and
based on the measured temperature being less than or equal to the reference temperature, determining the correction information based on the second parameter calibration model.

13. The parameter correction method of claim 12, wherein a temperature value of the reference temperature is in a range of 20° C. to 30° C.

14. The parameter correction method of claim 10, further comprising:
storing a first parameter calibration model corresponding to a first temperature that is greater than a default temperature upper limit, a second parameter calibration model corresponding to a second temperature that is less than or equal to a default temperature lower limit, and a third parameter calibration model corresponding to a default temperature range between the default temperature upper limit and the default temperature lower limit,
wherein the determining of the correction information comprises selecting one of the first parameter calibration model, the second parameter calibration model, and the third parameter calibration model based on the measured temperature, and determining the correction information corresponding to the measured temperature based on the selected model.

15. The parameter correction method of claim 10, wherein each of the plurality of parameter calibration models is built based on reference parameter values obtained by performing calibration at two or more temperature values included in a temperature range corresponding to a model among the plurality of parameter calibration models.

16. The parameter correction method of claim 15, wherein each of the plurality of parameter calibration models comprises at least one of a function representing a relationship between correction information and a temperature obtained based on a regression analysis corresponding to the reference parameter values, and mapping information corresponding to correction information mapped for each predetermined temperature.

17. The parameter correction method of claim 15, wherein at least one of the plurality of parameter calibration models is built based on reference parameter values obtained at first temperature intervals in a non-linear temperature section of a temperature range corresponding to the at least one of the plurality of parameter calibration models and reference correction values obtained at second temperature intervals, being wider than the first temperature intervals, in a temperature section other than the non-linear temperature section.

18. A non-transitory computer-readable storage medium storing instructions that, when executed by a processor, cause the processor to perform a parameter correction method, the method comprising:

providing, via a parallax optical element, light corresponding to an image output from a display to an eyebox of a user;

determining correction information corresponding to a temperature measured for the parallax optical element based on a parameter calibration model corresponding to the measured temperature among a plurality of parameter calibration models for determining correction information in different temperature ranges; and adjusting a parameter of the parallax optical element based on the correction information, wherein the plurality of temperature ranges corresponding to the plurality of parameter calibration models are different from each other, and wherein each temperature range among the plurality of temperature ranges comprises a plurality of temperature values corresponding to measured temperature values that are respectively input to parameter calibration model corresponding to the temperature range for determining the correction information.

* * * * *